(12) United States Patent
Nakamura

(10) Patent No.: US 6,661,681 B2
(45) Date of Patent: Dec. 9, 2003

(54) POWER CONVERTER APPARATUS WITH A CIRCUIT FOR PREVENTING DESTRUCTION OF A POWER DEVICE

(75) Inventor: Norihito Nakamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/137,288

(22) Filed: May 3, 2002

(65) Prior Publication Data

US 2002/0163820 A1 Nov. 7, 2002

(30) Foreign Application Priority Data

May 7, 2001 (JP) ....................... 2001-136436

(51) Int. Cl.⁷ ............................................ H02M 7/122
(52) U.S. Cl. .................................................. 363/56.03
(58) Field of Search ........................ 363/56.03, 56.04, 363/56.07, 56.1

(56) References Cited

U.S. PATENT DOCUMENTS

| | | | | |
|---|---|---|---|---|
| 4,213,103 A | * | 7/1980 | Birt | 363/56 |
| 4,270,164 A | * | 5/1981 | Wyman et al. | 363/56 |
| 4,371,824 A | * | 2/1983 | Gritter | 363/56 |
| 4,439,806 A | * | 3/1984 | Brajder | 363/56 |
| 4,796,145 A | * | 1/1989 | Oshikiri | 363/56 |
| 4,890,181 A | * | 12/1989 | Nerowski et al. | 363/56 |
| 5,257,174 A | * | 10/1993 | Ogiwara et al. | 363/56 |
| 5,457,364 A | * | 10/1995 | Bilotti et al. | 363/56 |
| 5,689,394 A | * | 11/1997 | Esser et al. | 363/56 |
| 5,737,200 A | * | 4/1998 | Miyashita et al. | 363/56 |
| 5,933,341 A | * | 8/1999 | Kuriyama et al. | 363/56 |
| 6,069,401 A | | 5/2000 | Nakamura et al. | 257/676 |
| 6,201,716 B1 | * | 3/2001 | Inoue | 363/56 |

FOREIGN PATENT DOCUMENTS

JP         4-172962         6/1992

* cited by examiner

Primary Examiner—Jeffrey Sterrett
(74) Attorney, Agent, or Firm—Oblon, Spivak, McClelland, Maier & Neustadt, P.C.

(57) ABSTRACT

A power converter apparatus comprises a detection circuit, a control circuit and a time period generating circuit. The detection circuit detects whether a power device is in a short-circuit state. The control circuit sets, when the detection circuit has detected that the power device is in the short-circuit state, the power device in an inoperable state for a predetermined time period, and restores the power device to an operable state after the passing of the predetermined time period. The time period generating circuit defines the predetermined time period for setting the power device in the inoperable state, by measuring a time from the detection of the short-circuit state by the detection circuit.

11 Claims, 3 Drawing Sheets

POWER CONVERTER APPARATUS WITH A CIRCUIT FOR PREVENTING DESTRUCTION OF A POWER DEVICE

CROSS-REFERENCE TO RELATED APPLICATIONS

This application is based upon and claims the benefit of priority from the prior Japanese Patent Application No. 2001-136436, filed May 7, 2001, the entire contents of which are incorporated herein by reference.

BACKGROUND OF THE INVENTION

1. Field of the Invention

The present invention relates generally to a power converter apparatus using a power device, and more particularly to a power converter apparatus used in an inverter system for compressors and fan motors of air conditioners, refrigerators, etc., motors of washers, etc., and hydraulic control motors.

2. Description of the Related Art

In a conventional inverter system, a control section (e.g. MCU) for PWM (pulse width modulation) control and a power device (e.g. an IGBT (insulated Gate Bipolar Transistor) and a gate drive IC) for supplying current to the winding of a motor are coupled by a photocoupler. Thus, even if the potential of the winding of the motor has accidentally dropped to a ground potential level and shorted, the abnormality of the high-side device can be told to the control section from the high-side driver IC via the photocoupler. Upon receiving the information on the abnormality, the control section stops the ON-instruction to the power device. Thereby, the power device can be protected.

FIG. 1 is a circuit diagram showing the structure of a conventional power converter apparatus using photocouplers.

As is shown in FIG. 1, the power converter apparatus comprises a control section (MCU) M101; photocouplers PC101 to PC106; voltage power supplies V101 to V106; clocked inverters CI101 to CI106; IGBTs (Insulated Gate Bipolar Transistor) 101 to 106; and resistors R101 to R112. A load motor L101 is connected to the IGBTs 101 to 103.

The system shown in FIG. 1 has the following problems.

Since the system requires six photocouplers, the manufacturing cost is high. Since there is a delay in transmission time of the photocouplers PC101 to PC106, an error is great between the time of an order from the control section M101 and the time of execution of the order. Four power supplies V102 to V105 are necessary as control power supplies. Thus, the power converter apparatus shown in FIG. 1 is not preferable in terms of both the cost and performance of the system.

Under the circumstances, most of modern power converter apparatuses have recently adopted a microcomputer direct driving system (photocoupler-less system) and a single power supply.

FIG. 2 is a circuit diagram showing the structure of a conventional bootstrap-type power converter using a microcomputer direct driving system and a single power supply.

As is shown in FIG. 2, the power converter apparatus comprises a control section (MCU) M101; clocked-inverters CI101 to CI109; voltage power supplies V101 and V106; IGBTs 101 to 106; transistors TR101 to TR103; diodes D101 to D103; capacitors C101 to C103; and resistors R113 to R115.

In this power converter apparatus, the high-side driving IC of the power device (IGBT 101, 102, 103) has the withstand voltage, which the photocouplers have to bear in the prior art. However, because of the problem of tolerable power, a control instruction from the control section M101 is sent to the high-side block by means of an edge pulse, and the edge pulse, in turn, is converted to a normal pulse within the high-side block.

As has been mentioned above, the transmission of signals from the low-side block to the high-side block within the high-side IC is effected by level-shifting using the edge pulse. Specifically, this is effected by short-time conduction of the high-withstand-voltage n-channel MOSFETs (TR101 to TR103). If the level-shifting n-channel MOSFETs (TR101 to TR103) (source-grounded) are turned on, current flows in the resistors R113 to R115 connected to the drains of these n-channel MOSFETs. At this time, voltage variations occurring between both ends of the resistors R113 to R115 are detected by the high-side block, and thereby signals are transmitted.

In general, in an inverter system used in a 100V commercial line, a voltage-doubler rectifier DC line is converter-controlled. Thus, the power device is required to have a withstand voltage of 600V, including a surge voltage. The above-mentioned level-shifting MOSFETs (TR101 to TR103) are also required to have a withstand voltage of 600V.

A high-withstand-voltage p-channel MOSFET is necessary for signal transmission from the high-side block to the low-side block. It is not possible, however, to realize a 600V p-channel MOSFET at a feasible cost.

Thus, when the high-side output section has shorted at a ground potential level, a large current flows. Even if the flow of large current is detected and a gate voltage to the IGBT is cut off by self-excess-current protection, the abnormality cannot be told to the low-side block. Consequently, the control section M101 is unaware of the short-circuit state of the high-side block at a ground potential level, and continues to send a turn-on instruction. In that event, enormous energy is applied to the high-side IGBT, leading to immediate destruction.

In the conventional system, the low-side power device (IGBT) can be protected against short-circuit to the voltage power supply. However, the high-side power device cannot be protected against short-circuit to the ground potential. The reason why the low-side power device can be protected against short-circuit to the voltage power supply is as follows. The low-side reference potential is equal to the reference potential of the control section. Thus, in the event of abnormality, information on the abnormality can be told to the control section from the low-side driver IC, and a turn-off instruction can be issued to the low-side power device.

However, if power to the high side is stopped when a large current in the high-side power device has been detected, the inverter system will halt even in the case of instantaneous flow of large current and the system will not function. Thus, this method cannot be used.

BRIEF SUMMARY OF THE INVENTION

According to an aspect of the present invention, there is provided a power converter apparatus comprising: a detection circuit which detects whether a power device is in a short-circuit state; a control circuit which sets, when the detection circuit has detected that the power device is in the short-circuit state, the power device in an inoperable state for a predetermined time period, and restores the power device to an operable state after the passing of the predetermined time period; and a time period generating circuit which defines the predetermined time period for setting the power device in the inoperable state, by measuring a time from the detection of the short-circuit state by the detection circuit.

DETAILED DESCRIPTION OF THE INVENTION

An embodiment of the present invention will now be described with reference to the accompanying drawings.

Figure 1:
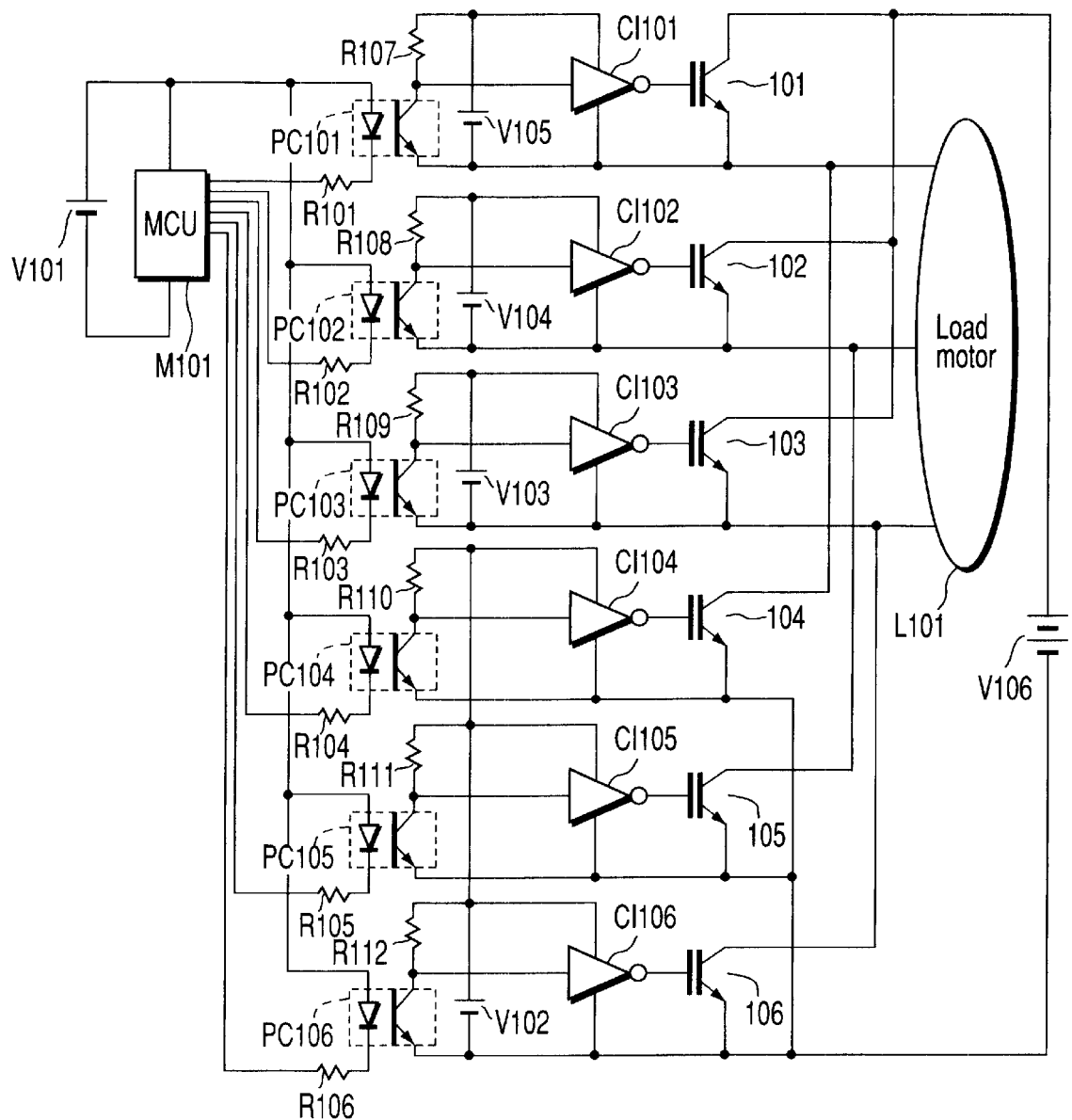
FIG. 1 is a circuit diagram showing the structure of a conventional power converter apparatus using photocouplers.
Figure 2:
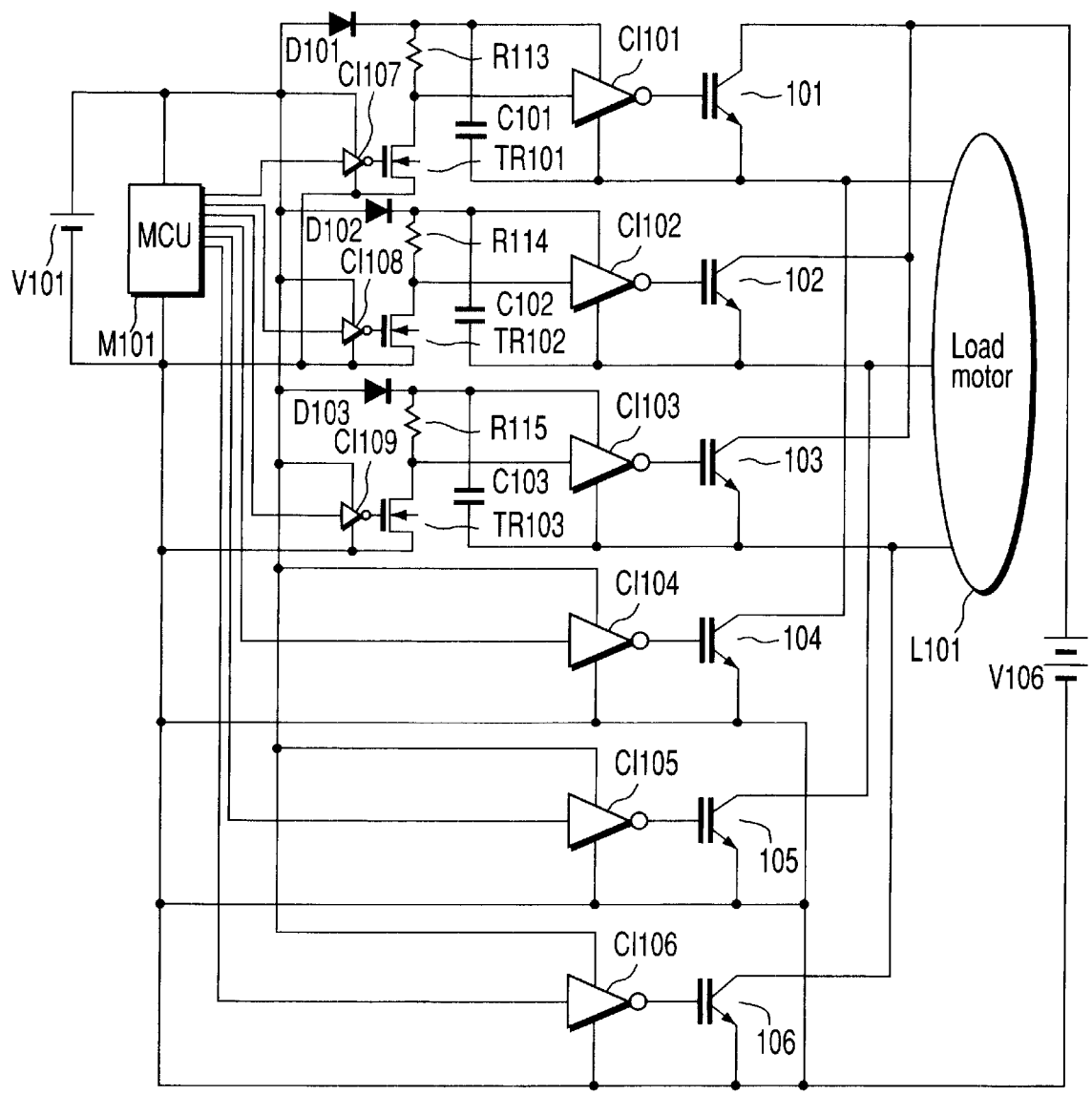
FIG. 2 is a circuit diagram showing the structure of a conventional bootstrap-type power converter apparatus using a microcomputer direct driving system and a single power supply.
Figure 3:
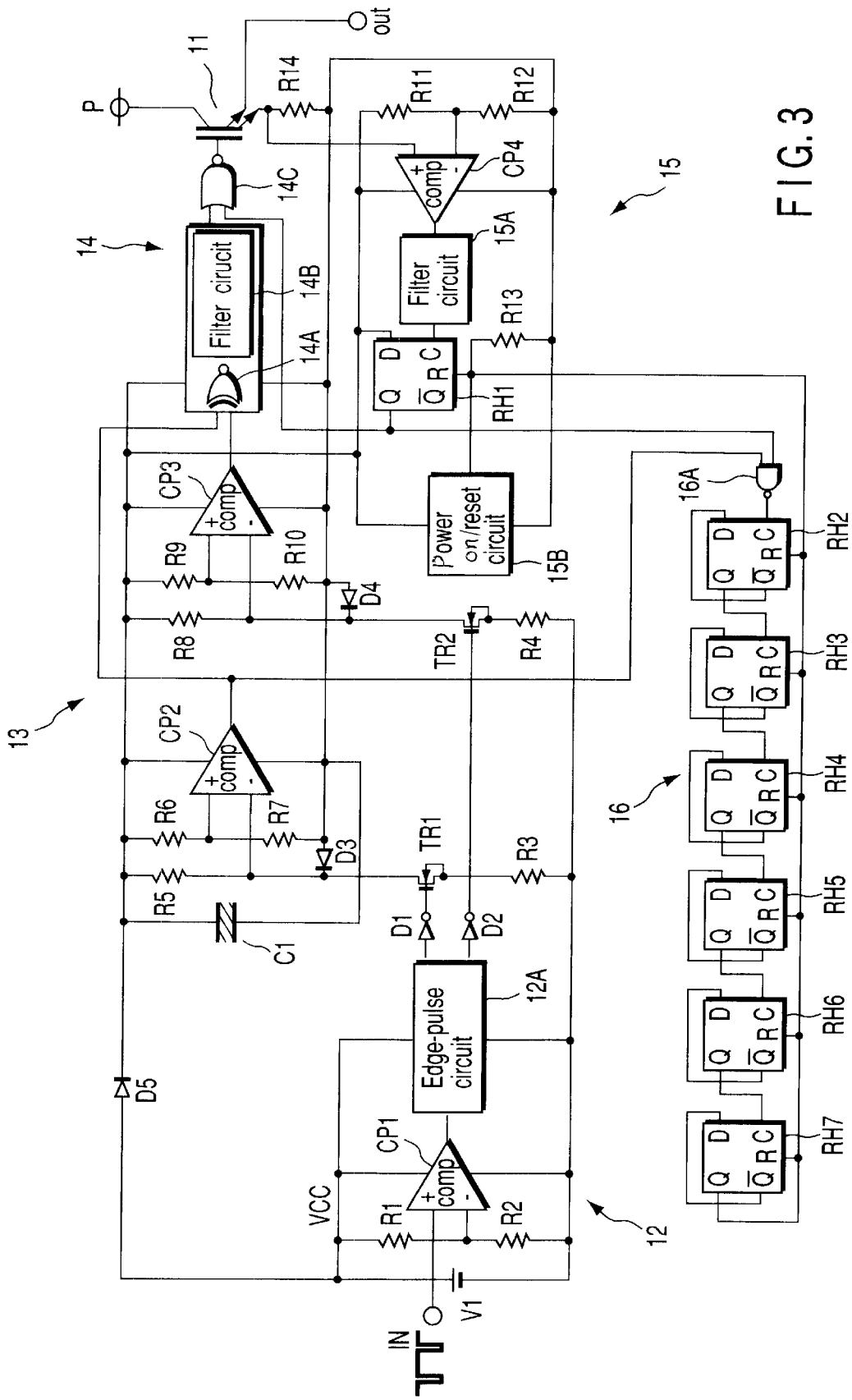
FIG. 3 is a circuit diagram showing the structure of a power converter apparatus according to an embodiment of the present invention.

FIG. 3 is a circuit diagram showing the structure of a power converter apparatus according to an embodiment of the invention.

As is shown in FIG. 3, the power converter apparatus comprises an IGBT 11, an edge-pulse generating circuit 12, a bootstrap circuit 13, a gate control circuit 14, a short-detection circuit 15, and an input-prohibit circuit 16.

The edge-pulse generating circuit 12 comprises an edge-pulse circuit 12A, a comparator CP1, diodes D1 and D2, MOS transistors TR1 and TR2, resistors R1 to R4, and a voltage power supply V1. The edge-pulse generating circuit 12 receives an input signal IN and outputs an edge-pulse.

The bootstrap circuit 13 comprises a capacitor C1 for bootstrap, comparators CP2 and CP3, resistors R5 to R10, and diodes D3, D4 and D5. The bootstrap circuit 13 outputs a generated high voltage to the gate control circuit 14.

The gate control circuit 14 comprises an exclusive NOR gate (EXNOR) 14A, a filter circuit 14B, a NOR gate 14C. The gate control circuit 14 provides a gate voltage to the gate of the IGBT 11 for controlling the operation thereof.

The short-detection circuit 15 comprises a comparator CP4, a filter circuit 15A, a latch circuit RH1, a power on/reset circuit 15B, and resistors R11 to R14. The short-detection circuit 15 detects a voltage at a sensing emitter terminal of the IGBT 11 by means of the comparator CP4. When the voltage of this emitter terminal is at a predetermined level or more, the output of the comparator CP4 is input to a C terminal of the latch circuit RH1 via the filter circuit 15A. The latch circuit RH1 delivers to an input terminal of the NOR gate 14C a signal for turning on the IGBT 11.

The input-prohibit circuit 16 comprises a NAND gate 16A and six series-connected latch circuits RH2 to RH7. When the short-detection circuit 15 has detected the short-circuit state of the IGBT 11, the input-prohibit circuit 16 sets a predetermined time period for turning off the IGBT 11. In other words, the input-prohibit circuit 16 sets an input prohibition time period within which an operational voltage input to the gate of the IGBT 11 is prohibited. In addition, the input-prohibit circuit 16 sets a dead time for eliminating noise or disturbance, after the power is switched on.

The power converter apparatus having the above structure operates as follows.

After the power is switched on, the input-prohibit circuit 16 sets the dead time for eliminating noise or disturbance. Once the dead time has passed, the edge-pulse generating circuit 12 and bootstrap circuit 13 generate a high voltage. When this high voltage has exceeded a predetermined voltage level, a signal voltage is supplied to the gate control circuit 14. Upon receiving the signal voltage, the gate control circuit 14 outputs to the gate of the IGBT 11 a gate voltage for controlling the operation of the IGBT 11.

While the IGBT 11 is operating, the short-detection circuit 15 detects a current flowing out of the sensing emitter terminal of the IGBT 11. If the detection result of the short-detection circuit 15 shows that the IGBT 11 is in a short-circuit state, that is, if the comparator CP4 has confirmed that the emitter voltage is at a predetermined level or more, the comparator CP4 delivers a signal voltage to the latch circuit RH1 via the filter circuit 15A.

Upon receiving the signal voltage, the latch circuit RH1 outputs to the NOR gate 14C of gate control circuit 14 a signal for turning off the IGBT 11. Thereby, the gate control circuit 14 turns off the IGBT 11.

At the same time as the latch circuit RH1 outputs the signal for turning off the IGBT 11, the latch circuit RH1 outputs a signal for starting the input prohibition time period to an input terminal of the NAND gate 16A of input-prohibit circuit 16. Thus, a counter comprising the latch circuits RH2 to RH7, which use the input pulse from the inverter control circuit as an oscillation source, begins to operate. The input pulse is divided up to a duration enough to protect the IGBT 11, and the IGBT 11 is protected with the obtained duration used as the input prohibition time period.

Thereafter, when the last stage (latch circuit RH7) of the frequency-division counter of the input-prohibit circuit 16 has become active, the latch circuit RH1 and the frequency-division counter comprising the latch circuits RH2 to RH7 are reset. Thereby, the signal voltage for turning off the IGBT 11, which is output to the gate control circuit 14, is stopped and the input prohibition time period is terminated.

For example, when the PWM frequency is 3 kHz, a time period of 21 ms is obtained by the input-prohibit circuit 16 with 6 division. The IGBT 11 can be protected by the input prohibition time period of 15 ms. If the input-prohibit circuit 16 is used, the input prohibition time period is terminated, i.e. the protection is released, after the passing of 21 ms. Thereafter, the PWM signal from the control circuit such as a microcomputer is made acceptable once again. Accordingly, if the system is normal, the normal inverter control state is restored.

On the other hand, when the high side is shorted to the ground potential from the viewpoint of hardware, a large current flows once again due to the detection of the short-circuit state, and the off-latch is effected by the short-detection circuit 15. As a result, the IGBT 11 is turned off for a predetermined time period. By the repetition of this operation, the motor control current output from the IGBT 11 becomes abnormal and, as a result, the system halts due to defective position detection, etc. However, the IGBT 11 is not destroyed and can be perfectly protected.

As has been described above, according to the present embodiment, when the short-circuit state of the IGBT has been detected, the IGBT is stopped only for a predetermined time period, and then the operable state is restored. Thereby, destruction of the IGBT can be prevented, and the inverter system can normally be operated.

According to the embodiment of the present invention, there is provided a power converter apparatus capable of preventing destruction of the power device, without halting the inverter system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power converter apparatus comprising:
    a detection circuit which detects whether a power device is in a short-circuit state;
    a control circuit which sets, when the detection circuit has detected that the power device is in the short-circuit state, the power device in an inoperable state for a predetermined time period, and restores the power device to an operable state after the passing of the predetermined time period; and
    a time period generating circuit which defines the predetermined time period for setting the power device in the inoperable state, by measuring a time from the detection of the short-circuit state by the detection circuit.

2. A power converter apparatus according to claim 1, wherein said power device has an output terminal for voltage detection, and when a voltage at this output terminal is higher than a predetermined voltage, the detection circuit detects that the power device is in the short-circuit state.

3. A power converter apparatus according to claim 1, wherein said time period generating circuit defines a time period for prohibiting an input to the power device, immediately after switching-on of power.

4. A power converter apparatus according to claim 1, wherein said time period generating circuit includes a plurality of series-connected latch circuits.

5. A power converter apparatus according to claim 1, wherein said power device is an IGBT.

6. A power converter apparatus comprising:
    a detection circuit which detects whether a power device is in a short-circuit state, and outputs a control signal for setting the power device in one of an inoperable state and an operable state in accordance with a result of the detection;
    a time period generating circuit which starts measuring of a predetermined time period for setting the power device in the inoperable state, when the detection circuit has detected that the power device is in the short-circuit state, and which outputs an end signal indicating the end of the predetermined time period, when said predetermined time period is terminated; and
    a control circuit which receives the control signal and the end signal and sets the power device in one of the inoperable state and the operable state in accordance with the control signal and the end signal.

7. A power converter apparatus according to claim 6, wherein said control circuit sets the power device in the inoperable state for the predetermined time period when the detection circuit has detected that the power device is in the short-circuit state, and said control circuit sets the power device in the operable state when said control circuit has received the end signal from the time period generating circuit.

8. A power converter apparatus according to claim 6, wherein said power device has an output terminal for voltage detection, and when a voltage at this output terminal is higher than a predetermined voltage, the detection circuit detects that the power device is in the short-circuit state.

9. A power converter apparatus according to claim 6, wherein said time period generating circuit defines a time period for prohibiting an input to the power device, immediately after switching-on of power.

10. A power converter apparatus according to claim 6, wherein said time period generating circuit includes a plurality of series-connected latch circuits.

11. A power converter apparatus according to claim 6, wherein said power device is an IGBT.

* * * * *